United States Patent
Bonner et al.

(10) Patent No.: US 9,774,134 B2
(45) Date of Patent: Sep. 26, 2017

(54) MODULAR SHELVING SYSTEMS, MAGNETIC ELECTRICAL CONNECTORS, CONDUCTOR ASSEMBLIES, AND MOUNTING INSERTS

(71) Applicant: Sunrise R&D Holdings, LLC, Cincinnati, OH (US)

(72) Inventors: Brett Bracewell Bonner, New Richmond, OH (US); Titus Arthur Jones, Hebron, KY (US); Richard Grosse, Cincinnati, OH (US); Raymond Lee Hicks, Burlington, KY (US); Ronald John Parigoris, Kings Park, NY (US); Benjamin Todd Hartman, New York, NY (US); Wayne Alan Gutschow, Yaphank, NY (US); John Henry Jahshan, Northville, MI (US)

(73) Assignee: Sunrise R&D Holdings, LLC, Cincinnati, OH (US)

( * ) Notice: Subject to any disclaimer, the term of this patent is extended or adjusted under 35 U.S.C. 154(b) by 160 days.

(21) Appl. No.: 14/719,877

(22) Filed: May 22, 2015

(65) Prior Publication Data
US 2016/0344135 A1 Nov. 24, 2016

(51) Int. Cl.
*H01R 13/62* (2006.01)
*H01R 13/74* (2006.01)
(Continued)

(52) U.S. Cl.
CPC ....... *H01R 13/6205* (2013.01); *A47F 5/0018* (2013.01); *A47F 5/0815* (2013.01);
(Continued)

(58) Field of Classification Search
None
See application file for complete search history.

(56) References Cited

U.S. PATENT DOCUMENTS

| | | | |
|---|---|---|---|
| 3,005,885 A | 10/1961 | Bowditch et al. |
| 5,154,509 A | 10/1992 | Wulfman et al. |
| | (Continued) | | |

FOREIGN PATENT DOCUMENTS

| | | |
|---|---|---|
| EP | 0903992 A1 | 3/1999 |
| GB | 2106212 A | 4/1983 |
| | (Continued) | |

OTHER PUBLICATIONS

International Search Report and Written Opinion mailed Dec. 8, 2016 with reference to PCT/US2016/032990.

*Primary Examiner* — Xanthia C Cunningham
(74) *Attorney, Agent, or Firm* — Dinsmore & Shohl LLP

(57) ABSTRACT

Modular shelving systems, magnetic electrical connectors, conductor assemblies, and mounting inserts are disclosed. A modular shelving system includes at least one shelving module, a power module coupled to the at least one shelving module, and a conductor assembly coupled to the at least one shelving module and electrically connected to the power module. The conductor assembly includes a board including a first column of apertures and a second column of apertures, a back plate formed from a ferromagnetic material or from a magnetic material, a first conductor electrically coupled to the power module and positioned between the back plate and the board, and a second conductor electrically coupled to the power module and positioned between the back plate and the board. The first conductor is aligned with the first column of apertures of the board. The second conductor is aligned with the second column of apertures of the board.

20 Claims, 11 Drawing Sheets

(51) Int. Cl.
*A47F 5/08* (2006.01)
*A47F 5/00* (2006.01)
*H01R 25/16* (2006.01)
*H01R 33/88* (2006.01)
*A47F 5/10* (2006.01)
*A47F 11/10* (2006.01)
*H01R 13/642* (2006.01)
*F21V 33/00* (2006.01)
*F21W 131/301* (2006.01)
*F16B 1/00* (2006.01)

(52) U.S. Cl.
CPC ............ *A47F 5/0823* (2013.01); *A47F 5/103* (2013.01); *A47F 11/10* (2013.01); *H01R 25/16* (2013.01); *H01R 33/88* (2013.01); *A47F 5/0068* (2013.01); *F16B 2001/0035* (2013.01); *F21V 33/0012* (2013.01); *F21W 2131/301* (2013.01); *H01R 13/642* (2013.01); *H01R 13/74* (2013.01)

(56) References Cited

U.S. PATENT DOCUMENTS

| | | | |
|---|---|---|---|
| 5,348,485 A * | 9/1994 | Briechle | G09F 3/208 439/110 |
| 5,593,049 A * | 1/1997 | Farham | H02G 3/288 174/499 |
| 5,794,794 A * | 8/1998 | Hull | H05K 7/18 211/187 |
| 5,829,987 A * | 11/1998 | Fritsch | H01R 13/7037 200/51.09 |
| RE36,030 E | 1/1999 | Nadeau | |
| RE36,226 E | 6/1999 | Antonio | |
| 6,105,794 A | 8/2000 | Bauer | |
| 6,113,198 A * | 9/2000 | Hommes | A47B 57/485 211/26 |
| 6,360,904 B1 | 3/2002 | Schilb et al. | |
| 6,570,492 B1 * | 5/2003 | Peratoner | G06F 3/147 340/12.3 |
| 6,747,204 B2 * | 6/2004 | DeLand | H02G 3/288 174/101 |
| 6,821,126 B2 | 11/2004 | Neidlein | |
| 6,885,911 B1 | 4/2005 | Smith | |
| 7,311,526 B2 | 12/2007 | Rohrbach et al. | |
| 7,351,066 B2 | 4/2008 | Difonzo et al. | |
| 7,517,222 B2 | 4/2009 | Rohrbach et al. | |
| 7,585,118 B1 | 9/2009 | Lumpkin | |
| 7,625,213 B1 | 12/2009 | Tse | |
| 7,641,477 B2 | 1/2010 | Difonzo et al. | |
| 7,645,143 B2 | 1/2010 | Rohrbach et al. | |
| 7,726,974 B2 | 6/2010 | Shah et al. | |
| 7,744,051 B2 | 6/2010 | Joyce et al. | |
| 7,766,502 B2 | 8/2010 | Tress | |
| 7,819,676 B1 | 10/2010 | Cardoso et al. | |
| 7,833,027 B2 | 11/2010 | Jong | |
| 7,890,207 B2 * | 2/2011 | Toscano | G11B 17/225 369/30.48 |
| 7,901,216 B2 | 3/2011 | Rohrbach et al. | |
| 7,908,029 B2 * | 3/2011 | Slocum, III | B25J 9/0093 700/214 |
| 7,911,778 B2 * | 3/2011 | Merrow | G11B 19/042 312/223.1 |
| 7,912,759 B2 | 3/2011 | Wolinsky et al. | |
| 8,087,939 B2 | 1/2012 | Rohrbach et al. | |
| 8,177,560 B2 | 5/2012 | Rohrbach et al. | |
| 8,261,416 B2 | 9/2012 | Rothbaum et al. | |
| 8,267,715 B2 | 9/2012 | Roosdorp et al. | |
| 8,360,802 B2 * | 1/2013 | Allard | F25D 23/00 312/223.6 |
| 8,403,680 B2 | 3/2013 | Schultz | |
| 8,435,042 B2 | 5/2013 | Rohrbach et al. | |
| 8,497,753 B2 | 7/2013 | Difonzo et al. | |
| 8,979,296 B2 * | 3/2015 | Wiemer | A47F 5/103 362/125 |
| 9,057,513 B2 * | 6/2015 | Lindblom | F21V 21/34 |
| 9,148,977 B1 * | 9/2015 | Williams | A47B 47/021 |
| 9,357,858 B2 * | 6/2016 | Sun | A47F 5/0018 |
| 9,404,645 B1 * | 8/2016 | Feng | F21V 23/001 |
| 2002/0159228 A1 | 10/2002 | Emberty et al. | |
| 2003/0122455 A1 * | 7/2003 | Caldwell | A47B 57/00 312/6 |
| 2003/0181081 A1 * | 9/2003 | Sikora | H01R 24/20 439/125 |
| 2006/0028802 A1 * | 2/2006 | Shaw | B01L 9/52 361/728 |
| 2006/0209537 A1 * | 9/2006 | Stelmasik | A47F 11/10 362/217.16 |
| 2007/0072443 A1 * | 3/2007 | Rohrbach | H01R 13/6205 439/39 |
| 2007/0193971 A1 * | 8/2007 | Hardy | A47F 1/125 211/189 |
| 2007/0259536 A1 | 11/2007 | Long et al. | |
| 2008/0068173 A1 * | 3/2008 | Alexis | H01Q 1/2208 340/572.7 |
| 2008/0092782 A1 * | 4/2008 | Daniel | A47F 5/103 108/50.02 |
| 2008/0284654 A1 * | 11/2008 | Burnside | G06K 7/0008 343/700 MS |
| 2010/0103687 A1 | 4/2010 | Pitlor | |
| 2010/0175919 A1 | 7/2010 | Ellis | |
| 2010/0290215 A1 * | 11/2010 | Metcalf | A47B 21/00 362/127 |
| 2011/0028006 A1 | 2/2011 | Shah et al. | |
| 2012/0193311 A1 * | 8/2012 | Benasillo | A47F 5/0018 211/59.2 |
| 2012/0243172 A1 * | 9/2012 | Ross | G06F 1/187 361/679.37 |
| 2013/0065406 A1 | 3/2013 | Rohrbach et al. | |
| 2013/0176398 A1 | 7/2013 | Bonner et al. | |
| 2013/0207478 A1 * | 8/2013 | Metcalf | A47C 7/70 307/104 |
| 2013/0225012 A1 | 8/2013 | Leng et al. | |
| 2013/0316549 A1 | 11/2013 | Difonzo et al. | |
| 2013/0337668 A1 | 12/2013 | Ernest et al. | |
| 2014/0045392 A1 * | 2/2014 | Masago | C23C 28/021 439/887 |
| 2014/0224875 A1 * | 8/2014 | Slesinger | H01R 25/142 235/385 |
| 2014/0227893 A1 | 8/2014 | Howard | |
| 2014/0334135 A1 * | 11/2014 | Fanourgiakis | A47B 45/00 362/127 |
| 2015/0083744 A1 * | 3/2015 | Vogler | A47F 1/126 221/154 |
| 2015/0093922 A1 * | 4/2015 | Bosscher | H01R 13/665 439/39 |
| 2015/0093923 A1 * | 4/2015 | Ju | H01R 13/03 439/83 |
| 2016/0172807 A1 * | 6/2016 | Clark-Ward | F21V 21/096 439/39 |
| 2016/0218462 A1 * | 7/2016 | Zhao | H01R 13/6205 |
| 2016/0227659 A1 * | 8/2016 | Lee | H01R 13/6205 |
| 2016/0261065 A1 * | 9/2016 | Chen | H01R 13/22 |

FOREIGN PATENT DOCUMENTS

| | | | |
|---|---|---|---|
| JP | 2000146085 A | 5/2000 | |
| KR | 100811681 B1 | 3/2008 | |

* cited by examiner

MODULAR SHELVING SYSTEMS, MAGNETIC ELECTRICAL CONNECTORS, CONDUCTOR ASSEMBLIES, AND MOUNTING INSERTS

TECHNICAL FIELD

The present specification relates to modular shelving systems, magnetic electrical connectors, conductor assemblies, and mounting inserts.

BACKGROUND

Products are generally displayed on shelves at a point of purchase. The shelves may include powered displays that provide information pertaining to the products displayed on the shelves, or any other type of information. Additional components in the vicinity of such shelves, such as wireless transmitters, cameras, microphones, lighting elements, or the like, may require power for operation.

Accordingly, there is a need for modular shelving systems including power distribution components.

SUMMARY

In one embodiment, a modular shelving system includes at least one shelving module, a power module coupled to the at least one shelving module, and a conductor assembly coupled to the at least one shelving module and electrically connected to the power module. The conductor assembly includes a board including a first column of apertures and a second column of apertures, a back plate formed from a ferromagnetic material or from a magnetic material, a first conductor electrically coupled to the power module and positioned between the back plate and the board, and a second conductor electrically coupled to the power module and positioned between the back plate and the board. The first conductor is aligned with the first column of apertures of the board. The second conductor is aligned with the second column of apertures of the board.

In another embodiment, a magnetic electrical connector includes a connector body, a first conductive terminal coupled to the connector body, and a second conductive terminal coupled to the connector body and spaced apart from the first conductive terminal. The first conductive terminal includes a first electrical contact surface. The second conductive terminal includes a second electrical contact surface. The magnetic electrical connector further includes a first magnet disposed between the connector body and the first electrical contact surface, and a second magnet disposed between the connector body and the second electrical contact surface.

In yet another embodiment, a conductor assembly includes a board including a first column of apertures and a second column of apertures, a back plate formed from a ferromagnetic material or from a magnetic material, a first conductor positioned between the back plate and the board, and a second conductor positioned between the back plate and the board. The first conductor is aligned with the first column of apertures of the board. The second conductor is aligned with the second column of apertures of the board.

In yet another embodiment, a mounting insert includes a top plate and a first bracket extending perpendicularly from the top plate. The first bracket includes a first aperture and a guide aperture. The mounting insert further includes a set member disposed within the first aperture of the first bracket, a second bracket, and a guide member coupled to the second bracket. The guide member extends through the guide aperture of the first bracket, thereby coupling the first bracket to the second bracket such that the second bracket extends perpendicularly relative to the top plate. When the set member engages a surface of the second bracket and the set member is rotated in a first direction, the set member moves in the direction of the second bracket, thereby moving the second bracket away from the first bracket such that a space between the first bracket and the second bracket is increased.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments described herein are directed to magnetic electrical connectors, conductor assemblies, and mounting inserts. Some modular shelving systems described herein include at least one shelving module, a power module coupled to the shelving module, and a conductor assembly coupled to the shelving module and electrically connected to the power module for distributing power from the power module to a powered component electrically connected to the conductor assembly. The power module may be secured to an interfacing upright in contact with the shelving module by a mounting insert that includes a top plate, a first bracket extending perpendicularly from the top plate and including a first aperture and a guide aperture, a set member disposed within the first aperture of the first bracket, a second bracket, and a guide member coupled to the second bracket. The conductor assembly may include a board including a first column of apertures and a second column of apertures parallel to the first column of apertures, a back plate, a first conductor positioned between the back plate and the board that is aligned with the first column of apertures, and a second conductor positioned between the back plate and the board that is aligned with the second column of apertures. Power may be delivered from the power module to a powered component electrically connected to the conductor assembly. In some embodiments, a magnetic electrical connector as described herein may be electrically connected to the powered component and may interface with the conductor assembly to deliver power from the power module to the powered component. The magnetic electrical connector may include a connector body, a first conductive terminal, a second conductive terminal, a first magnet disposed between the connector body and the first electrical contact surface, and a second magnet disposed between the connector body and the second electrical contact surface. Embodiments of the modular shelving systems, magnetic electrical connectors, conductor assemblies, and mounting inserts will be described in more detail herein with reference to the attached figures.

It should be understood that the mounting inserts, conductor assemblies, and magnetic electrical connectors are described as components of modular shelving systems, embodiments are not limited thereto. In particular, the mounting inserts, conductor assemblies, and magnetic electrical connectors described herein may be utilized independently or in an assembly or system other than a modular shelving system.

Figure 1:
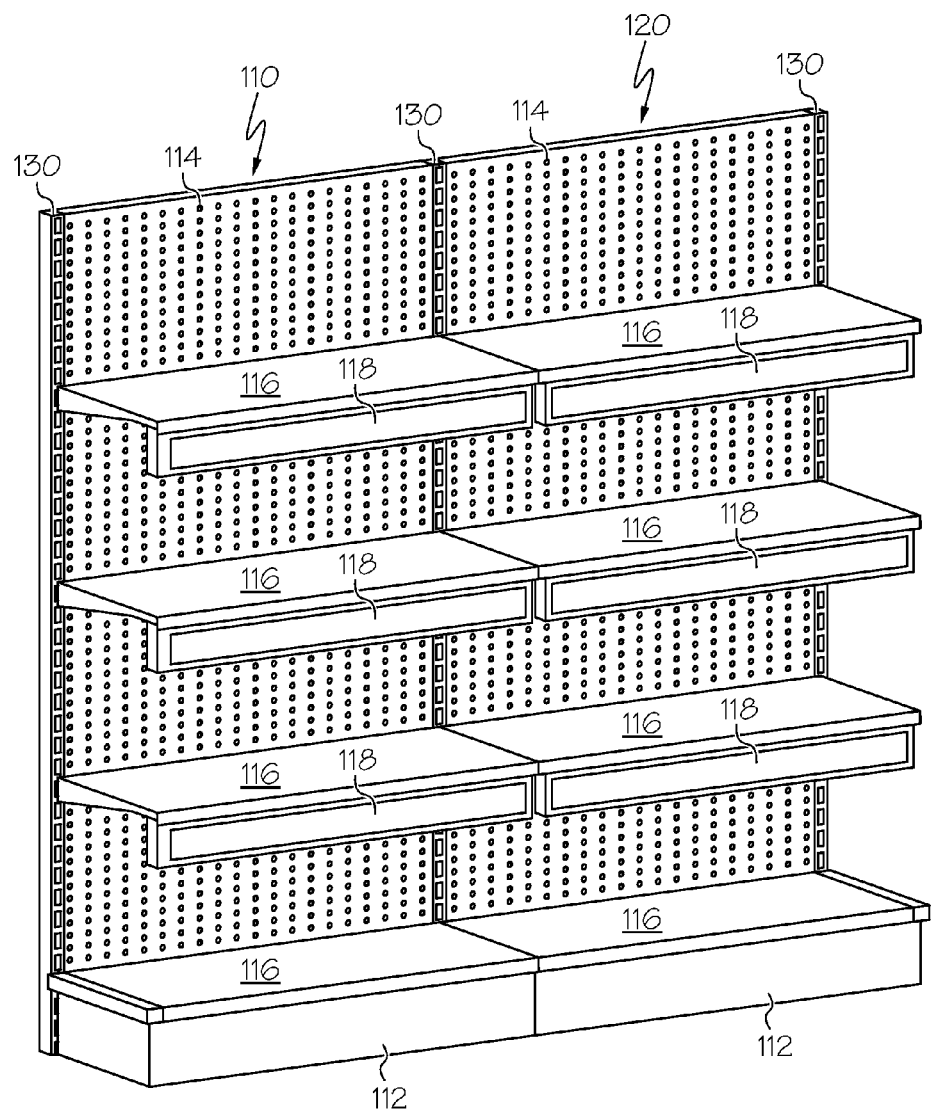
FIG. 1 schematically depicts a perspective view of two shelving modules secured by an interfacing upright, according to one or more embodiments shown and described herein.

Referring now to FIG. 1, a perspective view of a first shelving module 110, a second shelving module 120, and a plurality of interfacing uprights 130 is schematically depicted. Each of the first shelving module 110 and the second shelving module 120 includes a base 112, a back plane 114, a plurality of shelves 116, and a plurality of powered display units 118. The base 112 has a generally rectangular cuboid shape. The back plane 114 is generally planar and extends substantially perpendicularly from the base 112. The back plane 114 depicted in FIG. 1 is a board including a plurality of apertures. In other embodiments, the back plane 114 may not include a plurality of apertures, such as embodiments in which the back plane 114 is smooth or includes a plurality of slots The plurality of shelves 116 are secured to the plurality of interfacing uprights 130, each of which includes a plurality of apertures through which corresponding projections of the plurality of shelves 116 may be inserted to mount the plurality of shelves 116 to the shelving modules. The plurality of shelves 116 extend substantially perpendicularly from the back plane 114 in a direction that is substantially parallel to the base 112. The assembly of the shelving modules and the interfacing uprights 130 support the plurality of shelves 116 on which products may be placed. The plurality of powered display units 118 extend perpendicularly beneath the plurality of shelves 116 and are operable to display information to a person near the shelving modules, such as information pertaining to products on the plurality of shelves 116, information useful to stock products on the plurality of shelves 116, and a variety of additional information.

In some embodiments, each of the plurality of powered display units 118 may include a powered projector unit and a display screen, as described in U.S. patent application Ser. No. 13/734,443, entitled "DISPLAY SHELF MODULES WITH PROJECTORS FOR DISPLAYING PRODUCT INFORMATION AND MODULAR SHELVING SYSTEMS COMPRISING THE SAME," the entirety of which is incorporated herein by reference herein. In other embodiments, the plurality of powered display units 118 may include a plurality of powered display screens. While the embodiments depicted and described herein include a plurality of powered display units 118 that receive power from the power distribution system described in detail below, it should be understood that embodiments are not limited thereto. For example, some embodiments may not include the plurality of powered display units 118, but may instead include other powered components, such as wireless transmitters, cameras, microphones, lighting elements, or the like. Other embodiments may include the plurality of powered display units 118 and other components powered by the power distribution system described herein.

Still referring to FIG. 1, the base 112, the back plane 114, and the plurality of shelves 116 may be formed from metallic materials (e.g., steel, aluminum alloys, etc.), composite materials, particle board, or any other material suitable for load-bearing applications. The base 112 and the back plane 114 may be constructed as a single unitary piece, such as when the base 112 and the back plane 114 are joined by welding or the like. Alternatively, the base 112 and the back plane 114 may be formed as independent pieces and joined together with mechanical fasteners, such as screws, bolts, or the like.

Still referring to FIG. 1, one of the plurality of interfacing uprights 130 is positioned between the first shelving module 110 and the second shelving module 120 and secures the first shelving module 110 to the second shelving module 120. The other interfacing uprights 130 are positioned on the outside of each of the first shelving module 110 and the second shelving module 120 and function to support the plurality of shelves 160. The plurality of interfacing uprights 130 are generally rectangular and extend from the base 112 to a top of the back plane 114. The plurality of interfacing uprights 130 may be formed from a metallic material, a composite material, or any other material suitable for securing the first shelving module 110 to the second shelving module 120.

Figure 2:
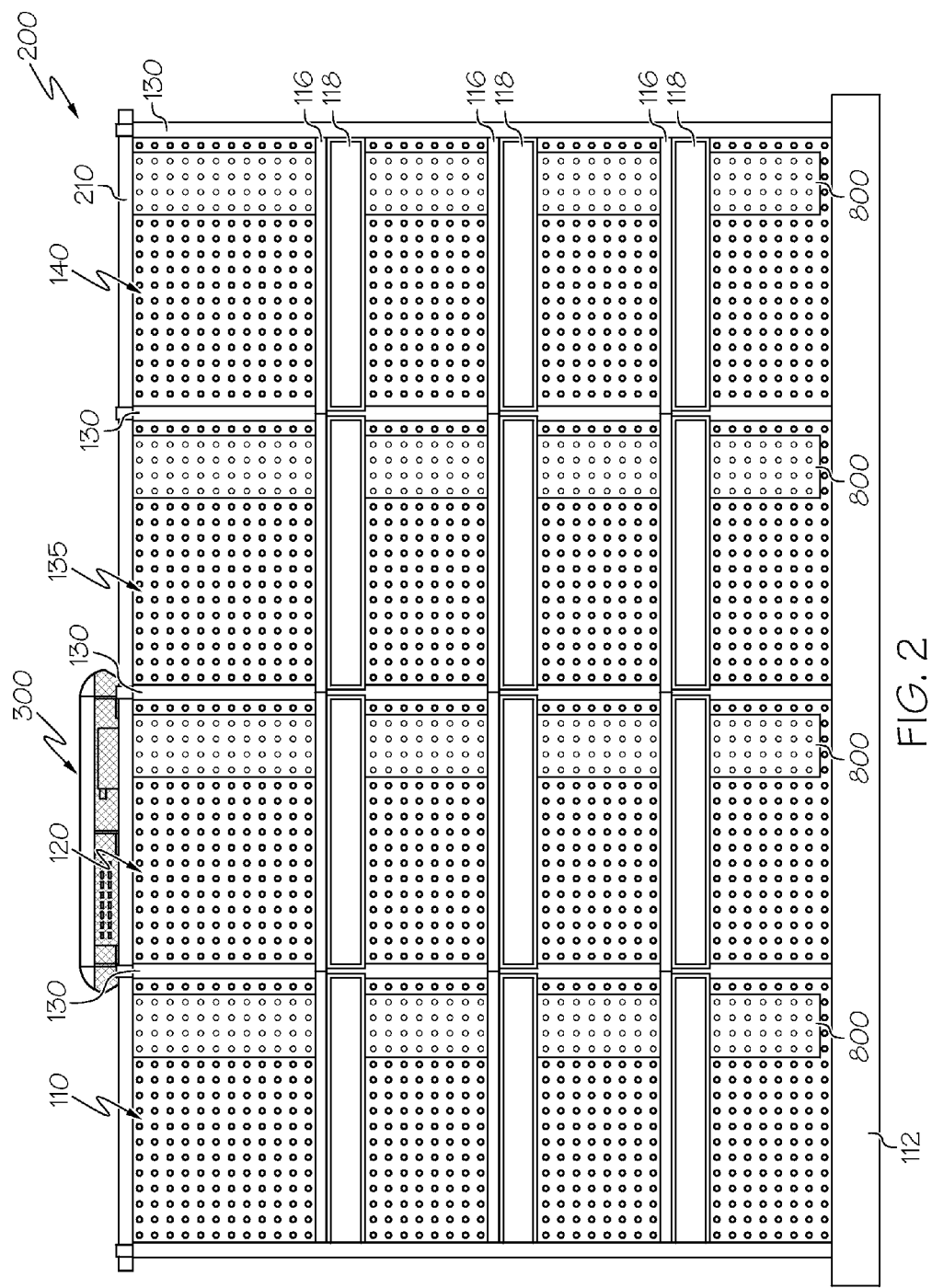
FIG. 2 schematically depicts a side view of a modular shelving system, according to one or more embodiments shown and described herein.

Referring now to FIG. 2, a modular shelving system 200 is schematically depicted. The modular shelving system 200 includes the first shelving module 110 of FIG. 1, the second shelving module 120 of FIG. 1, a third shelving module 135, a fourth shelving module 140, a plurality of interfacing uprights 130, a power module 300, a conduit 210, and a plurality of conductor assemblies 800. The third shelving module 135 and the fourth shelving module 140 include the same components as described above with respect to the first shelving module 110 and the second shelving module 120 of FIG. 1. The third shelving module 135 is secured to the second shelving module 120 by an interfacing upright 130. Similarly, the third shelving module 135 is secured to the fourth shelving module 140 by an interfacing upright 130.

Still referring to FIG. 2, the power module 300 is secured to the interfacing upright 130 by two mounting inserts (depicted in FIGS. 4-7 and described in detail below with respect to FIGS. 4-7), one of which is positioned within a top of the interfacing upright 130 that secures the first shelving module 110 to the second shelving module 120, and the other of which is positioned within a top of the interfacing upright 130 that secures the second shelving module 120 to the third shelving module 135.

Still referring to FIG. 2, the power module 300 is electrically coupled to each of the plurality of conductor assemblies 800 via wires that are housed within the conduit 210 that is disposed atop the shelving modules. Some embodiments may not include the conduit 210 and other embodiments may include a conduit 210 that is coupled to the modular shelving system 200 in a manner other than depicted in FIG. 2, such as when the conduit 210 is coupled to the base 112 of the shelving modules. The plurality of conductor assemblies 800 in turn distribute power to powered components (e.g., the powered display units 118) in the vicinity of the modular shelving system 200, as will be described below.

While there are four shelving modules supplied by the power module 300 in the embodiment depicted in FIG. 2, it should be understood that in other embodiments, the power module 300 may supply power to three or fewer shelving modules or five or more shelving modules. Furthermore, in other embodiments, not every shelving module may include a conductor assembly 800, such as in embodiments in which the conductor assembly 800 is included in a subset of the shelving modules, such as every other shelving module, every third shelving module, or the like.

Figure 3:
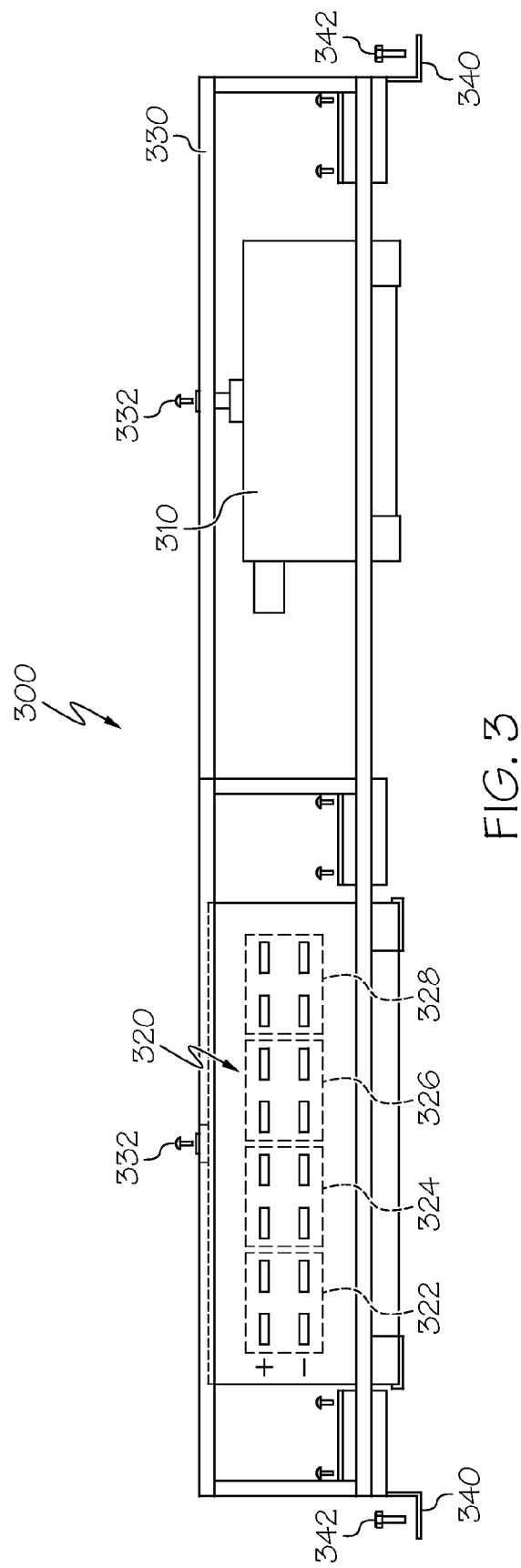
FIG. 3 schematically depicts a side view of a power module, according to one or more embodiments shown and described herein.

Referring now to FIG. 3, a side view of the power module 300 of FIG. 2 is schematically depicted. The power module 300 includes a power supply 310 and a master controller 320 housed within a housing 330. The power supply 310 receives input power from a source external to the modular shelving system 200, such as from an alternating current input (e.g., a 120 VAC input, a 240 VAC input, a 277 VAC input) or a direct current input. The power supply 310 provides power to the master controller 320, which includes a plurality of output channels for distributing power to the plurality of conductor assemblies 800. In embodiments in which the power supply 310 receives an alternating current input and the master controller 320 outputs direct current, at least one of the power supply 310 and the master controller 320 includes a rectifier. In embodiments in which the master controller 320 outputs a voltage different than the voltage of the input received by the power supply 310, at least one of the power supply 310 or the master controller 320 includes a transformer.

Still referring to FIG. 3, the master controller 320 includes sixteen output terminals including a first output terminal and a second output terminal for each of eight output channels. Two output channels are associated with each of the plurality of conductor assemblies 800. In particular, referring to FIGS. 3 and 2, a first pair of output channels 322 are associated with the conductor assembly 800 of the first shelving module 110, a second pair of output channels 324 are associated with the conductor assembly 800 of the second shelving module 120, a third pair of output channels 326 are associated with the conductor assembly 800 of the third shelving module 135, and a fourth pair of output channels 328 are associated with the conductor assembly 800 of the fourth shelving module 140. In other embodiments, the master controller 320 may include greater than sixteen or less than sixteen output terminals.

Referring once again to FIG. 3, the housing 330 houses the power supply 310 and the master controller 320. The housing 330 is secured to the power supply 310 and the master controller 320 by fasteners 332. Mounting brackets 340 extend from the bottom distal edges of the housing 330. The housing 330 is secured to mounting inserts (depicted in FIGS. 4-7 below) by fasteners 342 that are inserted through the mounting brackets 340.

Figure 4:
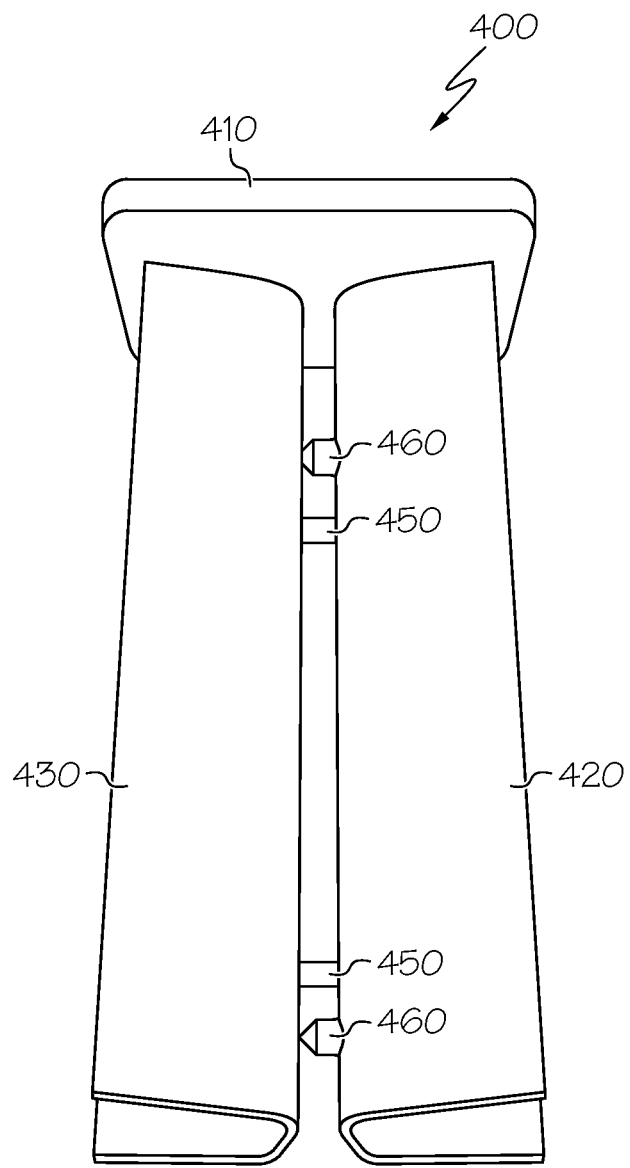
FIG. 4 schematically depicts a perspective view of a mounting insert, according to one or more embodiments shown and described herein.
Figure 5:
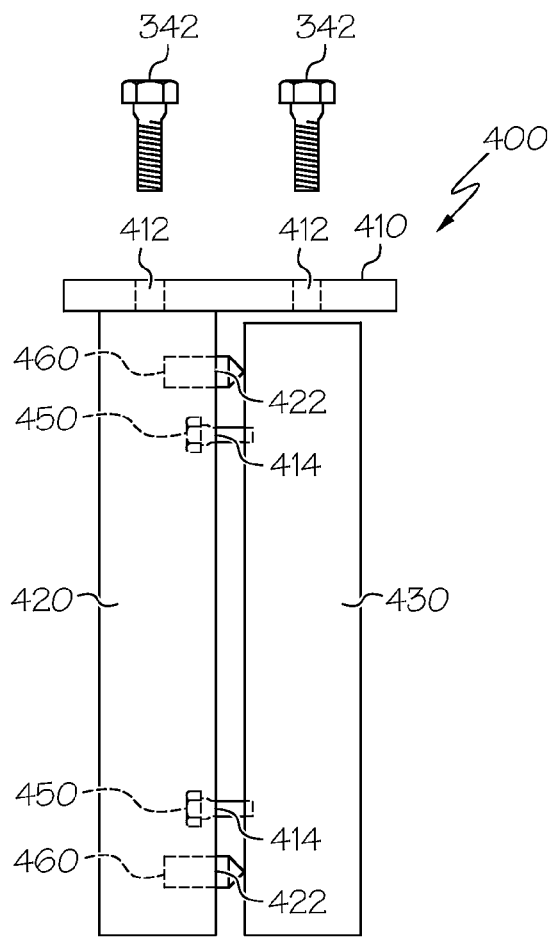
FIG. 5 schematically depicts a side view of the mounting insert of FIG. 4, further illustrating the components of the mounting insert, according to one or more embodiments shown and described herein.

Referring now to FIGS. 4 and 5, a perspective view (FIG. 4) and a side view (FIG. 5) of a mounting insert 400 is schematically depicted. As noted above, the mounting insert 400 may be inserted into a top of the interfacing upright 130 (see FIG. 2) for securing the power module 300 to the modular shelving system 200. However, the mounting insert 400 is not limited to securing power modules to interfacing uprights. In other embodiments, the mounting insert 400 may be used to secure a component other than a power module to a component other than an interfacing upright.

The mounting insert 400 includes a top plate 410, a first bracket 420, and a second bracket 430. The top plate 410 includes a plurality of apertures 412. The plurality of apertures 412 receive fasteners 342 (e.g., bolts or screws) to secure the power module 300 to the interfacing upright 130, such as when the mounting bracket 340 (see FIG. 3) of the power module 300 engages the top plate 410 of the mounting insert 400 and the fasteners 342 are placed through the mounting bracket 340 of the power module 300 and through the aperture 412 of the top plate 410, thereby securing the power module 300 to the interfacing upright 130. While the embodiment depicted in FIGS. 4 and 5 includes two apertures 412, it should be understood that other embodiments may include only one aperture or more than two apertures. Furthermore, some embodiments may not include the plurality of apertures 412, such as embodiments in which the power module 300 is affixed to the mounting insert 400 in another manner, such as with a clip, by welding, or the like.

Still referring to FIGS. 4 and 5, the first bracket 420 extends perpendicularly from the top plate 410. In some embodiments, the first bracket 420 is integrally formed with the top plate 410, such that the first bracket 420 and the top plate 410 form a unitary piece. In other embodiments, the first bracket 420 is attached to the top plate 410. The second bracket 430 is oriented perpendicular to the top plate 410 and extends parallel to the first bracket 420. The second bracket 430 floats relative to the top plate 410 because it is not directly attached to the top plate 410. In the embodiment depicted in FIGS. 4 and 5, the first bracket 420 and the second bracket 430 are c-shaped brackets in cross section.

However, it should be understood that in other embodiments, the first bracket 420 and the second bracket 430 may be shaped or configured differently than explicitly depicted and described herein.

Still referring to FIGS. 4 and 5, the first bracket 420 includes a plurality of threaded apertures 422 and a plurality of guide apertures 414. A plurality of threaded set members 460 are disposed within the plurality of threaded apertures 422. In some embodiments, the threaded set members 460 are threaded set screws. While the embodiment depicted in FIGS. 4 and 5 includes the plurality of threaded apertures 422 and the plurality of threaded set members 460, other embodiments may include apertures and set members that are not threaded. A plurality of guide members 450 are slidably engaged with the second bracket 430 and disposed within the plurality of guide apertures 414 of the first bracket 420. The guide members mechanically couple the first bracket 420 to the second bracket 430. In some embodiments, the guide members 450 are machine screws. In some embodiments, tips of the guide members 450 are welded to the second bracket 430 such that the guide members 450 are affixed to the second bracket 430. In other embodiments, the guide members 450 are not welded or affixed to the second bracket 430, such as in embodiments in which the second bracket 430 includes a plurality of guide apertures through which the plurality of guide members 450 extend.

While the embodiment depicted in FIGS. 4 and 5 includes two threaded apertures 422 and two guide apertures 414, other embodiments may include only one threaded aperture 422 and one guide aperture 414, three or more threaded apertures 422 and three or more guide apertures 414, or a different number of threaded apertures 422 and guide apertures 414. Some embodiments may not include the plurality of guide apertures 414, such as in embodiments in which a tip of the threaded set member is affixed to (e.g., welded to) the second bracket 430.

Figure 6:
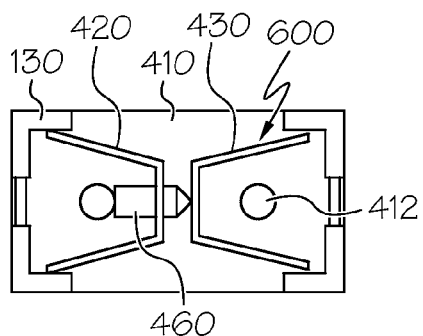
FIG. 6 schematically depicts a top view of the mounting insert of FIGS. 4 and 5 positioned within an interfacing upright in a pre-deployment configuration, according to one or more embodiments shown and described herein.
Figure 7:
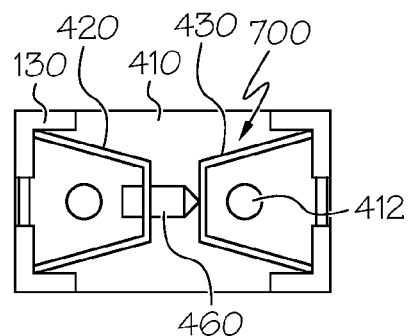
FIG. 7 schematically depicts a top view of the mounting insert of FIGS. 4 and 5 positioned within an interfacing upright in a deployed configuration in which the mounting insert frictionally engages the interfacing upright, according to one or more embodiments shown and described herein.

Referring now to FIGS. 6-7, the transition of the mounting insert 400 from a pre-deployment configuration 600 (FIG. 6) to a deployed configuration 700 (FIG. 7) is schematically depicted. Referring now to FIG. 6, which depicts a top view of the mounting insert 400 placed within the interfacing upright 130, the mounting insert 400 may be placed within the interfacing upright 130 in the pre-deployment configuration 600 in which first bracket 420 and the second bracket 430 of the mounting insert 400 do not engage the shorter interior sides of the interfacing upright 130. Then, when the threaded set member 460 is rotated in a first direction (i.e., either clockwise or counter-clockwise depending on the threading) and the threaded set member 460 engages a surface of the second bracket 430 (as depicted in FIGS. 4-6), the threaded set member 460 slides on the guide member 450 in the direction of the second bracket 430 (i.e., away from an interior of the first bracket 420), thereby moving the second bracket 430 away from the first bracket 420 such that a space between the first bracket 420 and the second bracket 430 is increased until the mounting insert 400 reaches a deployed configuration 700 (FIG. 7) in which the mounting insert 400 contacts the shorter sides of the interfacing upright 130 forming an interference fit with the interfacing upright 130. By deploying the mounting insert 400 to the deployed configuration 700 in which the mounting insert 400 engages the interfacing upright 130, the mounting insert 400 is secured to the interfacing upright 130, providing a stable base for securing the power module 300 to the interfacing upright 130, as described above.

Figure 8:
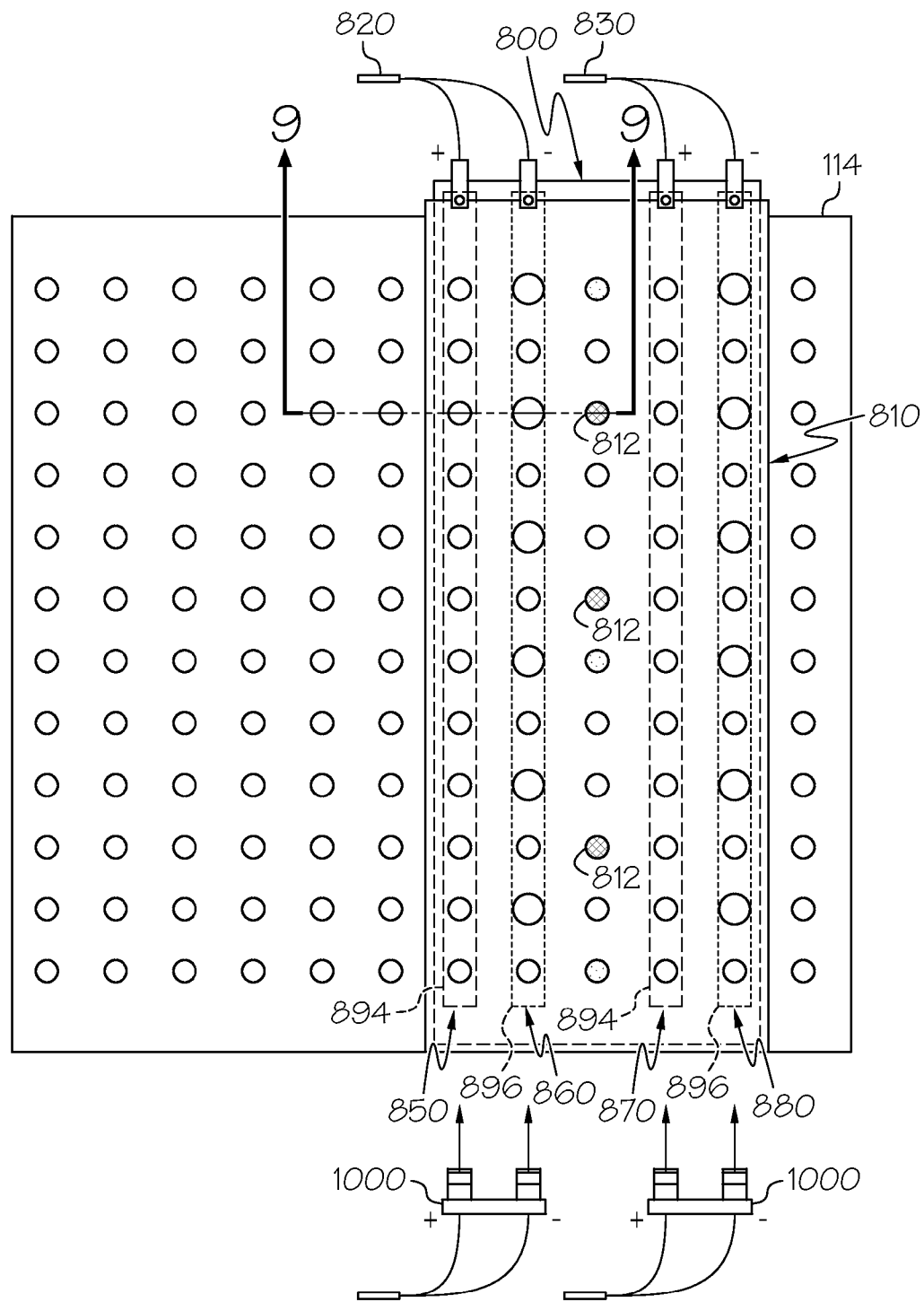
FIG. 8 schematically depicts a side view of a conductor assembly coupled to a back plane, according to one or more embodiments shown and described herein.
Figure 9:
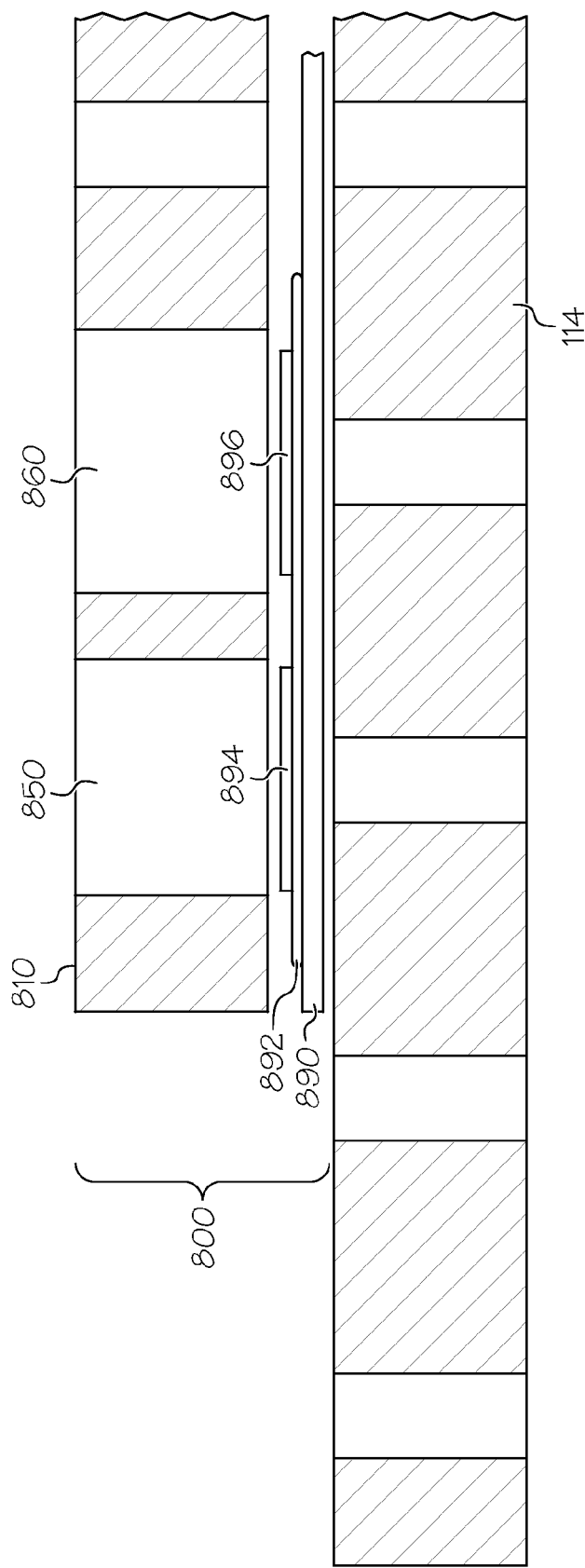
FIG. 9 schematically depicts a cross-sectional view of the conductor assembly of FIG. 8, according to one or more embodiments shown and described herein.

Referring now to FIGS. 8 and 9, a side view (FIG. 8) and a cross section (FIG. 9) of a conductor assembly 800 coupled to a back plane 114 of a shelving module is schematically depicted. The conductor assembly 800 is electrically connected to a first channel 820 (including a first wire (e.g. a positive wire) and a second wire (e.g. a negative wire)) and a second channel 830 (including a first wire (e.g. a positive wire) and a second wire (e.g. a negative wire)) of the master controller 320 (see FIG. 3) of the power module 300. The conductor assembly 800 includes a board 810, a plurality of first conductors 894, a plurality of second conductors 896, and a back plate 890.

Still referring to FIGS. 8 and 9, the board 810 is coupled to and secured to the back plane 114 by a plurality of fasteners 812, such as nuts or the like. The board 810 includes a first column of apertures 850, a second column of apertures 860, a third column of apertures 870, and a fourth column of apertures 880. In some embodiments, the board 810 is a peg board. In embodiments, the first column of apertures 850 and the second column of apertures 860 are parallel, as depicted in FIGS. 8-9. Similarly, in embodiments, the third column of apertures 870 and the fourth column of apertures 880 may also be parallel, as depicted in FIGS. 8-9. However, in some embodiments, the columns of apertures may not be parallel. While the apertures depicted in FIGS. 8 and 9 extend vertically, the columns of apertures may be oriented horizontally or diagonally in other embodiments. The diameter of at least one aperture of the first column of apertures 850 and at least one aperture of the second column of apertures 860 may be different. For example, as shown in FIG. 8, every other aperture of the second column of apertures 860 is larger than the corresponding aperture of the first column of apertures 850. In other embodiments, a shape of at least one aperture of the first column of apertures 850 and at least one aperture of the second column of apertures 860 may be different, such as when an aperture of the first column of apertures 850 is circle-shaped and an aperture of the second column of apertures 860 is square shaped. By differing the diameter or shape of an aperture of the first column of apertures 850 from the diameter of an aperture of the second column of apertures 860, a magnetic electrical connector 1000 (which supplies power to the powered display units or other powered components described herein) may only be inserted with the correct polarity, thereby avoiding the undesirable effects (e.g., short circuit) associated with coupling the magnetic electrical connector 1000 to the conductor assembly 800 with a reverse polarity.

Still referring to FIGS. 8 and 9, each aperture of the first column of apertures 850 has the same diameter. In other embodiments, the apertures of the first column of apertures 850 may be of non-constant diameter. Furthermore, in other embodiments every aperture of the second column of apertures 860 may have a different diameter than every aperture of the first column of apertures 850.

Referring now to FIG. 9, at least a portion of the back plate 890 is formed from or includes a ferromagnetic or magnetic material. In some embodiments, the back plate 890 is formed from a ferromagnetic or magnetic metal (e.g., steel) or a ferromagnetic or magnetic metal alloy. In some embodiments, the back plate 890 is a permanent magnet or an electromagnet. In some embodiments, the back plate 890 is electrically conductive. An electrically insulating adhesive 892, such as an adhesive tape, is positioned between the back plate 890 and the first conductor 894 and the second conductor 896. The electrically insulating adhesive 892 secures the first conductor 894 to the back plate 890 and secures the second conductor 896 to the back plate 890. Some embodiments may not include the electrically insulating adhesive 892, such as in embodiments in which the back plate is not electrically conductive.

Still referring to FIG. 9, the first conductor 894 is positioned between the back plate 890 and the board 810. The first conductor 894 is aligned with the first column of apertures 850 such that the first conductor 894 is accessible for electrical coupling through the first column of apertures 850. The first conductor 894 is electrically coupled to the power module 300 (FIGS. 2 and 3) via the first wire of the first channel 820 (see FIG. 8). The first conductor 894 may be formed from an electrically conductive metal (e.g., copper, aluminum, or the like) or from any electrically conductive material.

Referring once again to FIG. 9, the second conductor 896 is positioned between the back plate 890 and the board 810. The second conductor 896 is aligned with the second column of apertures 860 such that the second conductor 896 is accessible for electrical coupling through the second column of apertures 860. The second conductor 896 is electrically coupled to the power module 300 (FIGS. 2 and 3) via the second wire of the first channel 820 (see FIG. 8). The second conductor 896 may be formed from an electrically conductive metal (e.g., copper, aluminum, or the like) or from any electrically conductive material.

Components may be powered when connected to the first conductor 894 and the second conductor 896 of the conductor assembly 800, which in turn are in electrical communication with the power module 300. In some embodiments, the first conductor 894 and the second conductor 896 provide power to powered components via a magnetic electrical connector 1000 electrically coupled to the conductor assembly 800, as will now be described.

While the embodiment depicted in FIGS. 8-9 includes two channels, each having a first conductor 894 and a second conductor 896, other embodiments may include only one channel or more than three channels, each with a first conductor and second conductor. In other embodiments, multiple channels may share a single conductor, such as embodiments in which a plurality of channels each have a separate first conductor and share a common second conductor or in embodiments in which a plurality of channels each have a separate second conductor and share a common first conductor.

Figure 10:
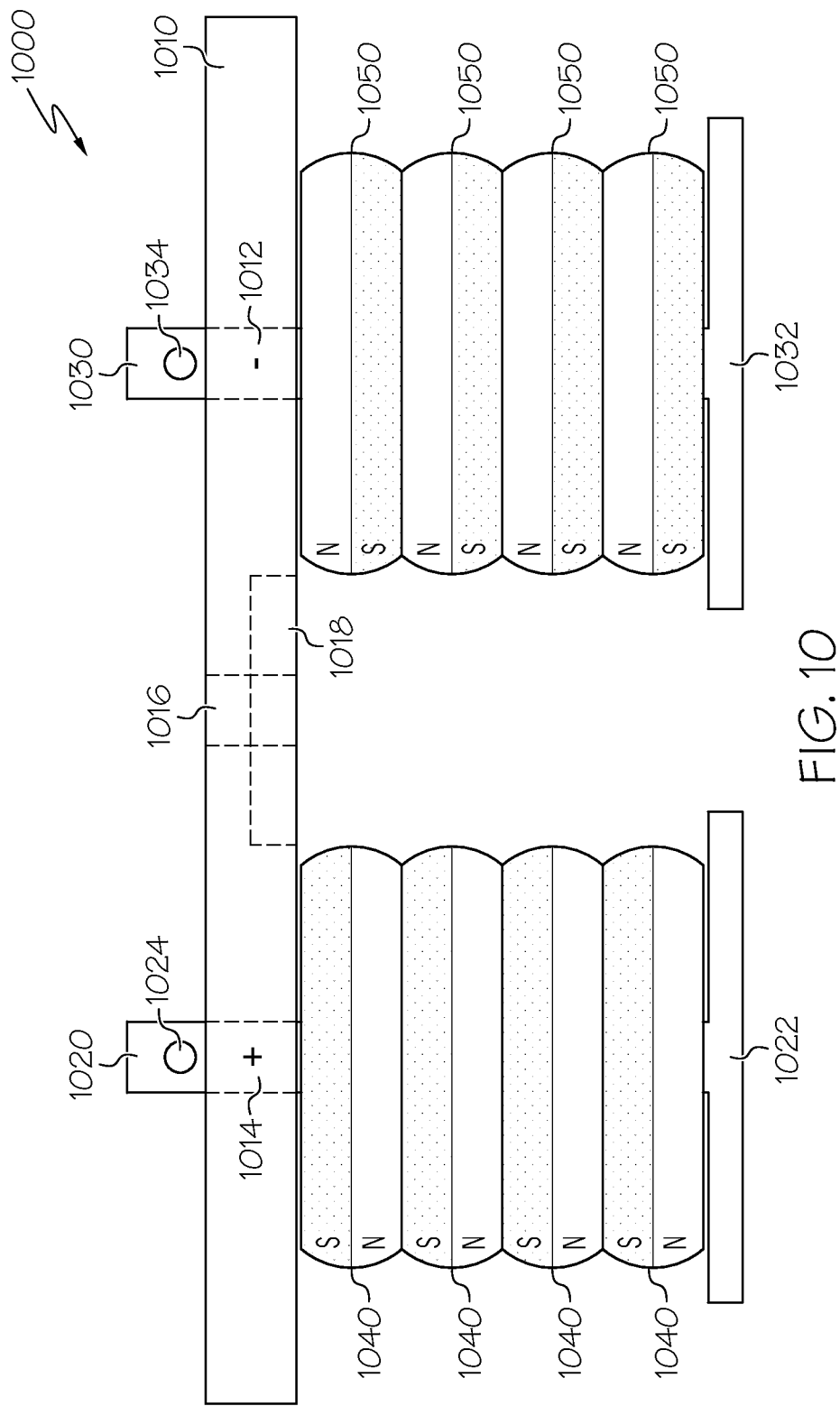
FIG. 10 schematically depicts a side view of a magnetic electrical connector, according to one or more embodiments shown and described herein.

Referring now to FIG. 10, a side view of a magnetic electrical connector 1000 is schematically depicted. The magnetic electrical connector 1000 includes a connector body 1010, a first conductive terminal 1020, a second conductive terminal 1030, a first plurality of magnets 1040, and a second plurality of magnets 1050.

Figure 13:
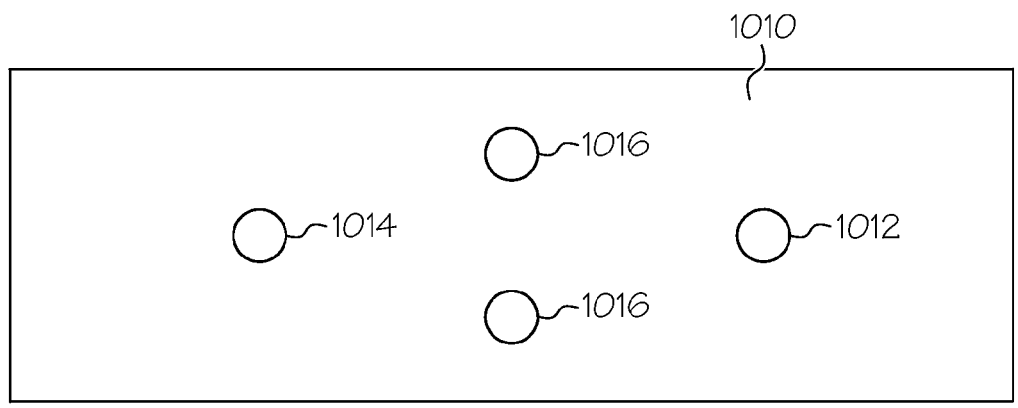
FIG. 13 schematically depicts a top view of a connector body of the magnetic electrical connector of FIG. 10, according to one or more embodiments shown and described herein.

Referring to FIG. 10 and FIG. 13 (which depicts a top view of the connector body 1010), the connector body 1010 includes a second terminal aperture 1012 extending through a thickness of the connector body 1010. The second conductive terminal 1030 extends through the second terminal aperture 1012. The connector body includes a first terminal aperture 1014 extending through a thickness of the connector body 1010. The first conductive terminal 1020 extends through the first terminal aperture 1014. The connector body 1010 also includes a plurality of fastening apertures 1016 through which a fastener, such as a cable tie or the like, may be looped to secure wires connected to the terminals to the connector body 1010. The connector body 1010 also includes a recess 1018 which may receive a portion of such a fastener. In some embodiments the connector body 1010 is formed from plastic, though the material of the connector body 1010 is not limited to plastic.

Figure 11:
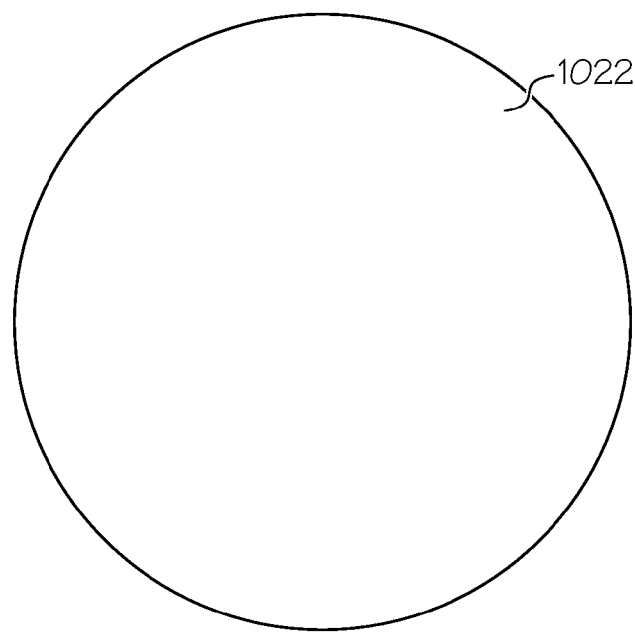
FIG. 11 schematically depicts a bottom view of a conductive terminal of the magnetic electrical connector of FIG. 10, according to one or more embodiments shown and described herein.
Figure 14:
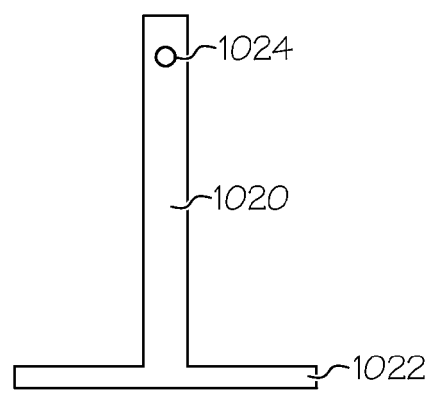
FIG. 14 schematically depicts a side view of a conductive terminal of the magnetic electrical connector of FIG. 10, according to one or more embodiments shown and described herein.

Still referring to FIG. 10, the first conductive terminal 1020 is coupled to the connector body 1010. The first conductive terminal 1020 terminates at a first electrical contact surface 1022 at a first end of the first conductive terminal 1020. In embodiments, the first electrical contact surface 1022 is planar and circular, as shown in FIG. 11. However, in other embodiments, the first electrical contact surface 1022 need not be planar or circular, but the first electrical contact surface 1022 is generally shaped for receipt by a corresponding aperture of the first column of apertures 850 (see FIG. 8). A second end of the first conductive terminal 1020 includes a first conductor entry aperture 1024 for receiving a first conductor (such as a wire) electrically coupled to a device (e.g., a powered display unit) to be powered by the power distribution system described herein. In some embodiments, the first conductive terminal 1020 is formed from brass, though the first conductive terminal 1020 may be formed from any other electrically conductive material in other embodiments. In some embodiments, the first electrical contact surface 1022 includes a corrosion resistant material, such as silver cadmium, tin, or another material that improves resistance to oxidation, corrosion, and/or voltage break-over effects, and enhances electrical integrity over time. In some embodiments, the first electrical contact surface 1022 includes at least one plated layer, such as a plated layer including a corrosion resistant material, such as silver cadmium, tin, or another material. In embodiments in which the first electrical contact surface 1022 includes at least one plated layer, the plated layer may improve resistance to oxidation, corrosion, and/or voltage break-over effects, and enhance electrical integrity over time. In some embodiment, the first electrical contact surface 1022 is not plated. In some embodiments, the first electrical contact surface 1022 is coated with a friction reducing coating, such as Teflon paste, a lubricating grease, or another substance. FIG. 14 depicts a side view of the first conductive terminal 1020.

Referring once again to FIG. 10, the second conductive terminal 1030 is coupled to the connector body 1010 and is spaced apart from the first conductive terminal 1020. The second conductive terminal 1030 terminates at a second electrical contact surface 1032 at a first end of the second conductive terminal 1030. In embodiments, the second electrical contact surface 1032 is planar and circular. However, in other embodiments, the second electrical contact surface 1032 need not be planar or circular, but the second electrical contact surface 1032 is generally shaped for receipt by a corresponding aperture of the second column of apertures 860 (see FIG. 8). A second end of the second conductive terminal 1030 includes a second conductor entry aperture 1034 for receiving a second conductor (such as a wire) electrically coupled to a device (e.g., a powered display unit) to be powered by the power distribution system described herein. In some embodiments, the second conductive terminal 1030 is formed from brass, though the second conductive terminal 1030 may be formed from any other electrically conductive material in other embodiments. In some embodiments, the second electrical contact surface 1032 includes a corrosion resistant material, such as silver cadmium, tin, or another material that improves resistance to oxidation, corrosion, and/or voltage break-over effects, and enhances electrical integrity over time. In some embodiments, the second electrical contact surface 1032 includes at least one plated layer, such as a plated layer including a corrosion resistant material, such as silver cadmium, tin, or another material. In embodiments in which the second electrical contact surface 1032 includes at least one plated layer, the plated layer may improve resistance to oxidation, corrosion, and/or voltage break-over effects, and enhance electrical integrity over time. In some embodiments, the second electrical contact surface 1032 is not plated. In some embodiments, the second electrical contact surface 1032 is coated with a friction reducing coating, such as Teflon paste, a lubricating grease, or another substance.

In the embodiment depicted in FIG. 10, a diameter of the first electrical contact surface 1022 is smaller than a diameter of the second electrical contact surface 1032 so that the magnetic electrical connector 1000 is received by the conductor assembly 800 (FIGS. 8-9), such that the first electrical contact surface 1022 is received by an aperture of the first column of apertures 850 corresponding to the first conductor 894 and the second electrical contact surface 1032 is received by an aperture of the second column of apertures 860 corresponding to the second conductor 896. In other embodiments, a shape of the first electrical contact surface 1022 is different than a shape of the second electrical contact surface 1032 so that the magnetic electrical connector 1000 is received by the conductor assembly 800 (FIGS. 8-9), such that the first electrical contact surface 1022 is received by an aperture of the first column of apertures 850 having the same shape as the first conductor 894 and the second electrical contact surface 1032 is received by an aperture of the second column of apertures 860 having the same shape as the second conductor 896.

Still referring to FIG. 10, the first plurality of magnets 1040 is disposed between the connector body 1010 and the first electrical contact surface 1022. Each of the first plurality of magnets 1040 includes an aperture. The first conductive terminal 1020 extends through the aperture of each of the first plurality of magnets 1040 such that the first plurality of magnets 1040 are secured between the connector body 1010 and the first electrical contact surface 1022, as depicted in FIG. 10. While the embodiment depicted in FIG. 10 includes the first plurality of magnets 1040, other embodiments may only include one magnet disposed between the connector body 1010 and the first electrical contact surface 1022.

Still referring to FIG. 10, the second plurality of magnets 1050 is disposed between the connector body 1010 and the second electrical contact surface 1032. Each of the second plurality of magnets 1050 includes an aperture. The second conductive terminal 1030 extends through the aperture of each of the second plurality of magnets 1050 such that the second plurality of magnets 1050 are secured between the connector body 1010 and the second electrical contact surface 1032, as depicted in FIG. 10. While the embodiment depicted in FIG. 10 includes the second plurality of magnets 1050, other embodiments may only include one magnet disposed between the connector body 1010 and the second electrical contact surface 1032.

Figure 12:
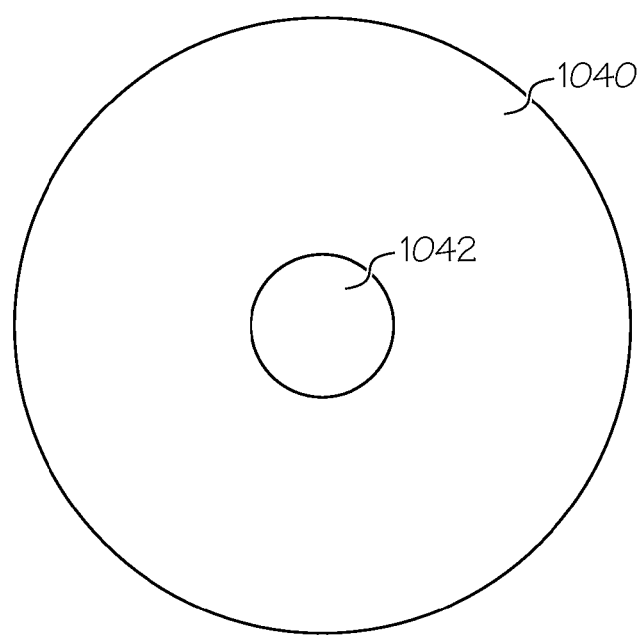
FIG. 12 schematically depicts a top view of a magnet of the magnetic electrical connector of FIG. 10, according to one or more embodiments shown and described herein.

In some embodiments, the first plurality of magnets 1040 and the second plurality of magnets 1050 are neodymium donut magnets, as depicted in FIG. 12. However, it should be appreciated that other magnets may be used in other embodiments. Furthermore, some embodiments may not include magnets on the magnetic electrical connector 1000, such as embodiments in which the back plate 890 is magnetic and the magnetic electrical connector 1000 includes a ferromagnetic material that is magnetically attracted to the back plate 890.

It should be understood that, when assembled, the first conductive terminal 1020 and the second conductive terminal 1030 of the magnetic electrical connector 1000 float relative to one another, thereby allowing tolerance for aligning the first conductive terminal 1020 and the second conductive terminal 1030 with the proper apertures of the conductor assembly 800.

Figure 15:
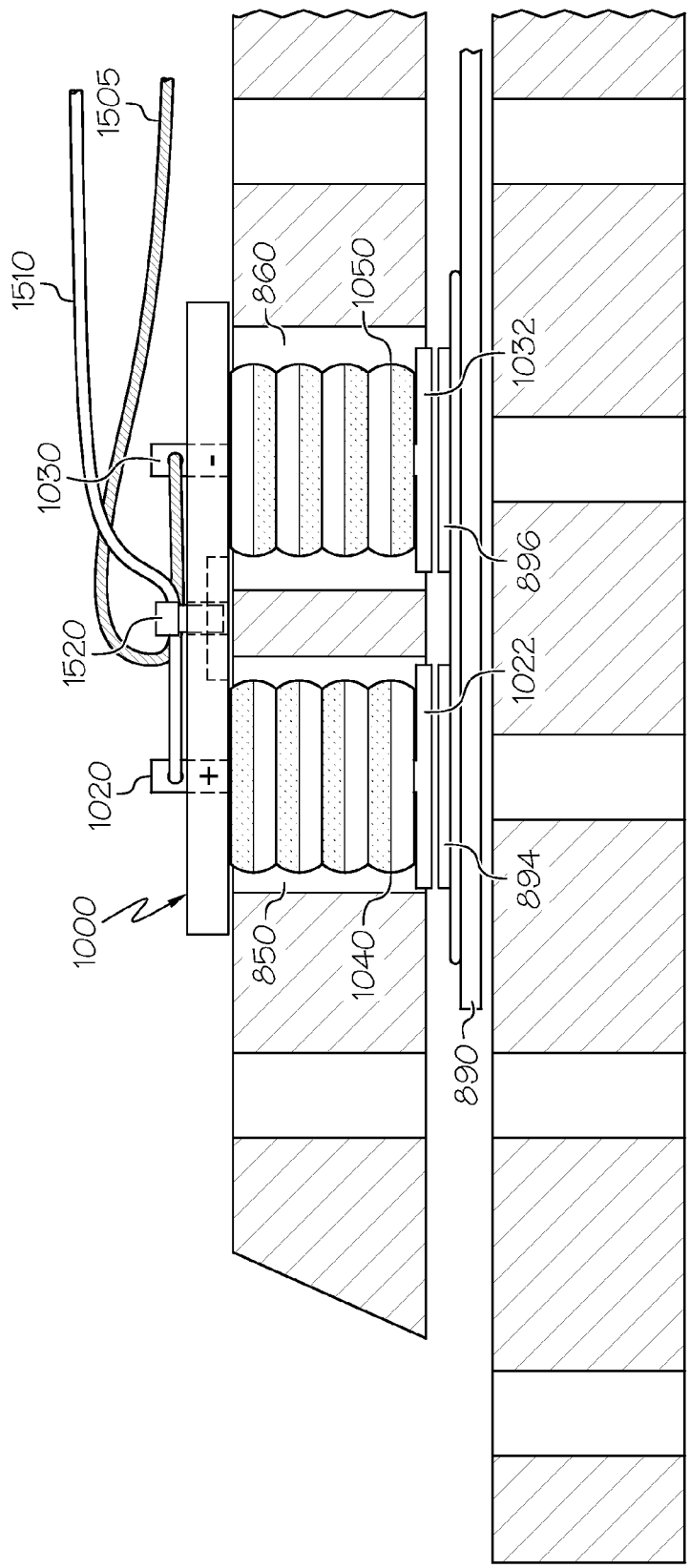
FIG. 15 schematically depicts a side view of a magnetic electrical connector coupled to a conductor assembly, according to one or more embodiments shown and described herein.

In operation, and as depicted in FIG. 15, when the magnetic electrical connector 1000 is positioned such that the first conductive terminal 1020 is positioned within the appropriate aperture of the first column of apertures 850 and the second conductive terminal 1030 is positioned within the appropriate aperture of the second column of apertures 860, the first plurality of magnets 1040 and the second plurality of magnets 1050 are attracted to the back plate 890 of the conductor assembly 800, thereby mechanically coupling the magnetic electrical connector 1000 to the conductor assembly 800. In particular, the first conductive terminal 1020 is disposed within a first aperture of the first column of apertures 850, such that the first conductor 894 is electrically coupled to the first conductive terminal 1020. Likewise, the second conductive terminal 1030 is disposed within a second aperture of the second column of apertures 860, such that the second conductor 896 is electrically coupled to the second conductive terminal 1030. Accordingly, the power module 300 will be coupled to a device electrically coupled to the magnetic electrical connector 1000 via the intermediary conductor assembly 800. The powered device may be disconnected by pulling the magnetic electrical connector 1000 away from the conductor assembly 800. In some embodiments, the pull force required to overcome the magnetic attraction of the magnetic electrical connector 1000 and the conductor assembly 800 in order to pull the magnetic electrical connector 1000 away from the conductor assembly 800 may not be greater than a force that can be comfortably exerted by a human, such as a pull force of about 10 pounds or a pull force of about 15 pounds. In some embodiments, the magnets of the magnetic electrical connector 1000 are of sufficient strength to mechanically couple the magnetic electrical connector 1000 to the conductor assembly 800 with sufficient magnetic force to maintain mechanical and electrical coupling of the conductor assembly 800 and the magnetic electrical connector 1000 despite mechanical shock, vibration, or temperature changes of the surrounding environment. In some embodiments, the magnetic electrical connector 1000 may be configured to be mechanically coupled to the conductor assembly 800 such that the electrical contact surfaces of the conductive terminals of the magnetic electrical connector 1000 swipe across the conductors of the conductor assembly 800 as the magnetic electrical connector 1000 is coupled to the conductor assembly 800 in order to clear debris resulting from oxidation, corrosion, or voltage break-over, and improve electrical integrity between the electrical contact surfaces of the magnetic electrical connector 1000 and the conductors of the conductor assembly 800.

In some embodiments, the first conductive terminal 1020 or the second conductive terminal 1030 may include one or more magnets extending from the connector body 1010 and terminating with an electrical contact surface, such that the electrical contact surface of the one or more magnets can be electrically coupled to an opposing conductor. In such embodiments, the one or more magnets may be electrically connected to an electric circuit.

It should now be understood that the modular shelving systems including interfacing uprights, conductor assemblies, and magnetic electrical connectors described herein provide a convenient and scalable power distribution architecture for distributing power from a power module coupled to a shelving module to a powered component electrically connected to the conductor assembly. The conductor assemblies described herein may ensure that a corresponding magnetic electrical connector is coupled to the conductor assembly with the correct polarity, thereby avoiding the undesirable effects (e.g., short circuit) associated with coupling the magnetic electrical connector to the conductor assembly with a reverse polarity. The magnetic electrical connector described herein provides a quick, efficient, and easy way to couple the magnetic electrical connector to a corresponding conductor assembly by the magnetic attraction of magnets of the magnetic electrical connector to a magnetic element of the conductor assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A modular shelving system comprising:
at least one shelving module;
a power module coupled to the at least one shelving module;
a conductor assembly coupled to the at least one shelving module and electrically connected to the power module, the conductor assembly comprising:
   a board including a first column of apertures and a second column of apertures;
   a back plate formed from a ferromagnetic material or from a magnetic material;
   a first conductor electrically coupled to the power module and positioned between the back plate and the board, wherein the first conductor is aligned with the first column of apertures of the board; and
   a second conductor electrically coupled to the power module and positioned between the back plate and the board, wherein the second conductor is aligned with the second column of apertures of the board.

2. The modular shelving system of claim 1, wherein a diameter of at least one aperture of the first column of apertures is different from a diameter of at least one aperture of the second column of apertures.

3. The modular shelving system of claim 1, further comprising:
a magnetic electrical connector electrically coupled to the conductor assembly, the magnetic electrical connector comprising:
   a connector body;
   a first conductive terminal coupled to the connector body, the first conductive terminal comprising a first electrical contact surface;
   a second conductive terminal coupled to the connector body and spaced apart from the first conductive terminal, the second conductive terminal comprising a second electrical contact surface;
   a first magnet disposed between the connector body and the first electrical contact surface; and
   a second magnet disposed between the connector body and the second electrical contact surface, wherein:
      the first magnet and the second magnet are attracted to the back plate of the conductor assembly, thereby mechanically coupling the magnetic electrical connector to the conductor assembly;
      the first conductive terminal is disposed within an aperture of the first column of apertures such that the first conductor is electrically coupled to the first electrical contact surface; and
      the second conductive terminal is disposed within an aperture of the second column of apertures such that the second conductor is electrically coupled to the second electrical contact surface.

4. The modular shelving system of claim 3, wherein the at least one shelving module comprises:
a base;
a back plane extending perpendicularly from the base, wherein the conductor assembly is coupled to the back plane;
at least one shelf extending from the back plane; and
at least one powered display unit coupled to the at least one shelf, wherein the at least one powered display unit is electrically coupled to the conductor assembly by the magnetic electrical connector.

5. A magnetic electrical connector comprising:
a connector body;
a first conductive terminal coupled to the connector body, the first conductive terminal comprising a first electrical contact surface;
a second conductive terminal coupled to the connector body and spaced apart from the first conductive terminal, the second conductive terminal comprising a second electrical contact surface;
a first magnet disposed between the connector body and the first electrical contact surface; and
a second magnet disposed between the connector body and the second electrical contact surface, wherein:
the second electrical contact surface is planar and circular;
the first electrical contact surface is planar and circular; and
a diameter of the second electrical contact surface is different from a diameter of the first electrical contact surface.

6. The magnetic electrical connector of claim 5, wherein:
at least one of the first electrical contact surface and the second electrical contact surface includes, or is plated with, a corrosion resistant material; and
at least one of the first electrical contact surface and the second electrical contact surface is coated with a friction reducing coating.

7. The magnetic electrical connector of claim 5, wherein:
the first magnet includes an aperture;
the first conductive terminal extends through the aperture of the first magnet;
the second magnet includes an aperture; and
the second conductive terminal extends through the aperture of the second magnet.

8. The magnetic electrical connector of claim 5, wherein:
the first conductive terminal terminates at the first electrical contact surface at a first end of the first conductive terminal; and
the second conductive terminal terminates at the second electrical contact surface at a first end of the second conductive terminal.

9. The magnetic electrical connector of claim 8, wherein:
the connector body includes a second terminal aperture extending through a thickness of the connector body;
the second conductive terminal extends through the second terminal aperture;
the connector body includes a first terminal aperture extending through the thickness of the connector body; and
the first conductive terminal extends through the first terminal aperture.

10. The magnetic electrical connector of claim 9, wherein:
a second end of the second conductive terminal includes a second conductor entry aperture; and
a second end of the first conductive terminal includes a first conductor entry aperture.

11. A conductor assembly comprising:
a board including a first column of apertures and a second column of apertures;
a back plate formed from a ferromagnetic material or from a magnetic material;
a first conductor positioned between the back plate and the board, wherein the first conductor is aligned with the first column of apertures of the board; and
a second conductor positioned between the back plate and the board, wherein the second conductor is aligned with the second column of apertures of the board.

12. The conductor assembly of claim 11, further comprising an electrically insulating adhesive positioned between the back plate and at least one of the first conductor and the second conductor, wherein the electrically insulating adhesive secures the back plate to at least one of the first conductor and the second conductor.

13. The conductor assembly of claim 11, wherein a diameter of at least one aperture of the first column of apertures is different from a diameter of at least one aperture of the second column of apertures.

14. A mounting insert comprising:
a top plate;
a first bracket extending perpendicularly from the top plate, the first bracket including a first aperture and a guide aperture;
a set member disposed within the first aperture of the first bracket;
a second bracket; and
a guide member coupled to the second bracket, wherein:
the guide member extends through the guide aperture of the first bracket, thereby coupling the first bracket to the second bracket such that the second bracket extends perpendicularly relative to the top plate; and
when the set member engages a surface of the second bracket and the set member is rotated in a first direction, the set member moves in the direction of the second bracket, thereby moving the second bracket away from the first bracket such that a space between the first bracket and the second bracket is increased.

15. The mounting insert of claim 14, wherein the first aperture is a threaded aperture and the set member is a threaded set member.

16. The mounting insert of claim 14, wherein the guide member is affixed to the second bracket or integrally formed with the second bracket.

17. The mounting insert of claim 14, wherein the top plate further comprises an aperture.

18. The mounting insert of claim 14, wherein the top plate and the first bracket are integrally formed.

19. A modular shelving system comprising:
a first shelving module;
a second shelving module;
an interfacing upright positioned between the first shelving module and the second shelving module, wherein the interfacing upright secures the first shelving module to the second shelving module; and
a power module, wherein the mounting insert of claim 16 is positioned within the interfacing upright, and wherein the power module is secured to the interfacing upright by the mounting insert.

20. The modular shelving system of claim 19, wherein:
the top plate further comprises an aperture;
the mounting insert further comprises a mounting bracket; and
the power module is secured to the modular shelving system by a fastener that extends through the mounting bracket and through the aperture of the top plate, thereby securing the power module to the interfacing upright.

* * * * *

UNITED STATES PATENT AND TRADEMARK OFFICE
CERTIFICATE OF CORRECTION

PATENT NO. : 9,774,134 B2  
APPLICATION NO. : 14/719877  
DATED : September 26, 2017  
INVENTOR(S) : Brett Bracewell Bonner et al.

Page 1 of 1

It is certified that error appears in the above-identified patent and that said Letters Patent is hereby corrected as shown below:

In the Claims

In Column 16, Line 31: change "claim 16" to --claim 14--

Signed and Sealed this  
Twenty-fourth Day of April, 2018

Andrei Iancu  
*Director of the United States Patent and Trademark Office*